United States Patent
Lu et al.

(10) Patent No.: US 10,963,283 B2
(45) Date of Patent: Mar. 30, 2021

(54) CONFIGURATION MANAGEMENT FOR HYBRID CLOUD

(71) Applicant: Nutanix, Inc., San Jose, CA (US)

(72) Inventors: Zihong Lu, San Jose, CA (US); Deepak Vankadaru, San Jose, CA (US); Sarah Hernandez, San Jose, CA (US); Shravan Satish Palyam, San Jose, CA (US); Sripradha Karkala, San Jose, CA (US); Rajesh Aavuty, San Jose, CA (US); Harry Yang, San Jose, CA (US); Shyama Duriseti, San Jose, CA (US); Sudhakar Kamanboina, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 176 days.

(21) Appl. No.: 16/234,557

(22) Filed: Dec. 27, 2018

(65) Prior Publication Data
US 2020/0210218 A1     Jul. 2, 2020

(51) Int. Cl.
*G06F 15/177* (2006.01)
*G06F 9/455* (2018.01)
(Continued)

(52) U.S. Cl.
CPC .......... *G06F 9/45558* (2013.01); *G06F 9/548* (2013.01); *G06F 16/2477* (2019.01);
(Continued)

(58) Field of Classification Search
CPC .. G06F 9/45558; G06F 9/548; G06F 9/45553; G06F 2009/4557;
(Continued)

(56) References Cited

U.S. PATENT DOCUMENTS 8,549,518 B1  10/2013  Aron et al.
8,601,473 B1  12/2013  Aron et al.
(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
(Continued)

*Primary Examiner* — Thu Ha T Nguyen
(74) *Attorney, Agent, or Firm* — Foley & Lardner LLP

(57) ABSTRACT

A system and method include tracking virtual entities in a hybrid cloud system. The method includes receiving, at a management processor of a virtual hybrid computing system, a migration request to move a virtual entity from a first cloud sub-system to a second cloud sub-system; adding, by the management processor, a source proxy object representing the virtual entity exiting the first cloud sub-system to a first database, wherein the source proxy object includes a destination identifier and an exit time; executing, by the management processor, a logical migration of the virtual entity from the first cloud sub-system to the second cloud subsystem; receiving, at the management processor, a management query including a query time corresponding to a time for which status information of the virtual entity is requested; determining, at the management processor, whether the query time is before the exit time of the source proxy object; and invoking, from the management processor, a first management software application program interface (API) for the first cloud sub-system when the query time is before the exit time of the source proxy object.

22 Claims, 3 Drawing Sheets

(51) Int. Cl.
  *H04L 12/24* (2006.01)
  *G06F 16/2458* (2019.01)
  *G06F 9/54* (2006.01)

(52) U.S. Cl.
  CPC .. *H04L 41/0813* (2013.01); *G06F 2009/4557* (2013.01); *G06F 2009/45595* (2013.01)

(58) Field of Classification Search
  CPC ....... G06F 2009/45595; G06F 16/2477; G06F 16/24; G06F 16/2447; G06F 16/2322; H04L 41/0813
  USPC ........................................ 709/220, 221, 222
  See application file for complete search history.

(56) References Cited

U.S. PATENT DOCUMENTS

| | | | |
|---|---|---|---|
| 8,850,130 | B1 | 9/2014 | Aron et al. |
| 9,270,553 | B1* | 2/2016 | Higgins ................ H04W 4/60 |
| 9,304,796 | B1* | 4/2016 | Douglas ............. G06F 11/0712 |
| 9,417,968 | B2* | 8/2016 | Dornemann ........ G06F 9/45558 |
| 9,419,856 | B1* | 8/2016 | Chawla ................ H04L 41/082 |
| 9,553,788 | B1* | 1/2017 | Callan .................... H04L 43/10 |
| 9,712,455 | B1* | 7/2017 | Mittal ................. H04L 12/4641 |
| 9,772,866 | B1 | 9/2017 | Aron et al. |
| 9,893,940 | B1* | 2/2018 | Chawla ............... H04L 41/0816 |
| 10,114,706 | B1* | 10/2018 | Chougala ............ G06F 11/1456 |
| 10,116,491 | B1* | 10/2018 | Wang ................. H04L 43/0811 |
| 10,325,115 | B1* | 6/2019 | Zeldin ................... G06F 21/577 |
| 10,402,172 | B1* | 9/2019 | Mandich ................ G06F 7/588 |
| 10,565,382 | B1* | 2/2020 | Diamant ............... G06F 21/575 |
| 10,572,271 | B1* | 2/2020 | Tsirkin .................... H04L 9/088 |
| 10,599,504 | B1* | 3/2020 | Beserra .............. G06F 11/0727 |
| 10,664,535 | B1* | 5/2020 | Hahn .................... G06F 16/904 |
| 2012/0042034 | A1* | 2/2012 | Goggin ................. G06F 3/0647 709/216 |
| 2013/0036307 | A1* | 2/2013 | Gagliano ............ H04L 63/0823 713/171 |
| 2013/0238786 | A1* | 9/2013 | Khesin .............. H04L 29/08099 709/224 |
| 2013/0262390 | A1* | 10/2013 | Kumarasamy ...... H04L 67/2804 707/649 |
| 2013/0262638 | A1* | 10/2013 | Kumarasamy ........ G06F 15/177 709/221 |
| 2014/0108665 | A1* | 4/2014 | Arora ..................... G06F 9/5077 709/227 |
| 2015/0032817 | A1* | 1/2015 | Garg ................... G06F 11/2035 709/204 |
| 2015/0096011 | A1* | 4/2015 | Watt .................... H04L 63/0272 726/15 |
| 2015/0100958 | A1* | 4/2015 | Banavalikar ........ G06F 9/45533 718/1 |
| 2015/0212856 | A1* | 7/2015 | Shanmuganathan ....................... G06F 9/5077 709/226 |
| 2015/0331635 | A1* | 11/2015 | Ben-Shaul .............. G06F 3/061 711/120 |
| 2015/0341230 | A1 | 11/2015 | Dave et al. |
| 2016/0188353 | A1* | 6/2016 | Shu ..................... G06F 9/45558 718/1 |
| 2016/0259661 | A1* | 9/2016 | Tasoulas ................... G06F 9/48 |
| 2017/0099188 | A1* | 4/2017 | Chang ..................... H04L 63/20 |
| 2017/0366606 | A1* | 12/2017 | Ben-Shaul ............. G06F 3/064 |
| 2018/0129523 | A1* | 5/2018 | Bryant ................ G06F 9/45558 |
| 2018/0131907 | A1* | 5/2018 | Schmirler .......... H04N 5/23238 |
| 2018/0225288 | A1 | 8/2018 | Shivam et al. |
| 2019/0288915 | A1* | 9/2019 | Denyer ............ G06Q 10/06315 |
| 2019/0317802 | A1* | 10/2019 | Bachmutsky ......... G06F 9/4843 |
| 2020/0133718 | A1* | 4/2020 | Koehler ............... G06F 9/45533 |
| 2020/0159624 | A1* | 5/2020 | Malkov ............... G06F 11/1448 |

OTHER PUBLICATIONS

Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Cano, Ignacio, et al. "Curator: Self-Managing Storage for Enterprise Clusters" (Mar. 27, 2017), from https://www.usenix.org/conference/nsdi17/.

* cited by examiner

CONFIGURATION MANAGEMENT FOR HYBRID CLOUD

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

In accordance with at least some aspects of the present disclosure, a method of tracking virtual entities in a hybrid cloud system is disclosed. The method includes receiving, at a management processor of a virtual hybrid computing system, a migration request to move a virtual entity from a first cloud sub-system to a second cloud sub-system; adding, by the management processor, a source proxy object representing the virtual entity exiting the first cloud sub-system to a first database, wherein the source proxy object includes a destination identifier and an exit time; executing, by the management processor, a logical migration of the virtual entity from the first cloud sub-system to the second cloud subsystem; receiving, at the management processor, a management query including a query time corresponding to a time for which status information of the virtual entity is requested; determining, at the management processor, whether the query time is before the exit time of the source proxy object; and invoking, from the management processor, a first management software application program interface (API) for the first cloud sub-system when the query time is before the exit time of the source proxy object.

In accordance with some other aspects of the present disclosure, a migration server is disclosed. The migration server includes a processing unit having a processor and a memory. The processing unit is configured to receive a migration request to migrate a virtual entity from a first cloud sub-system to a second cloud subsystem; create a source proxy object in a first database, wherein the source proxy object represents the virtual entity leaving the first cloud sub-system to a first database, wherein the source proxy object includes a destination identifier and an exit time; perform a logical migration of the virtual entity from the first cloud sub-system to the second cloud subsystem; receive a management query including a query time corresponding to a time for which status information of the virtual entity is requested; assess whether the query time is before the exit time of the source proxy object; and obtain virtual entity information using a first management software application program interface (API) for the first cloud sub-system when the query time is before the exit time of the source proxy object.

In accordance with yet other embodiments of the present disclosure, a non-transitory computer readable media is disclosed. The non-transitory computer readable media includes computer-executable instructions that, when executed by a processor of an entity management system of a virtual computing system, cause the entity management system to perform a process. The process includes receiving a migration request to move a virtual entity from a first cloud sub-system to a second cloud sub-system; adding a source proxy object representing the virtual entity exiting the first cloud sub-system to a first database, wherein the source proxy object includes a destination identifier and an exit time; executing a logical migration of the virtual entity from the first cloud sub-system to the second cloud subsystem; receiving a management query including a query time corresponding to a time for which status information of the virtual entity is requested; determining whether the query time is before the exit time of the source proxy object; and invoking a first management software application program interface (API) for the first cloud sub-system when the query time is before the exit time of the source proxy object.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
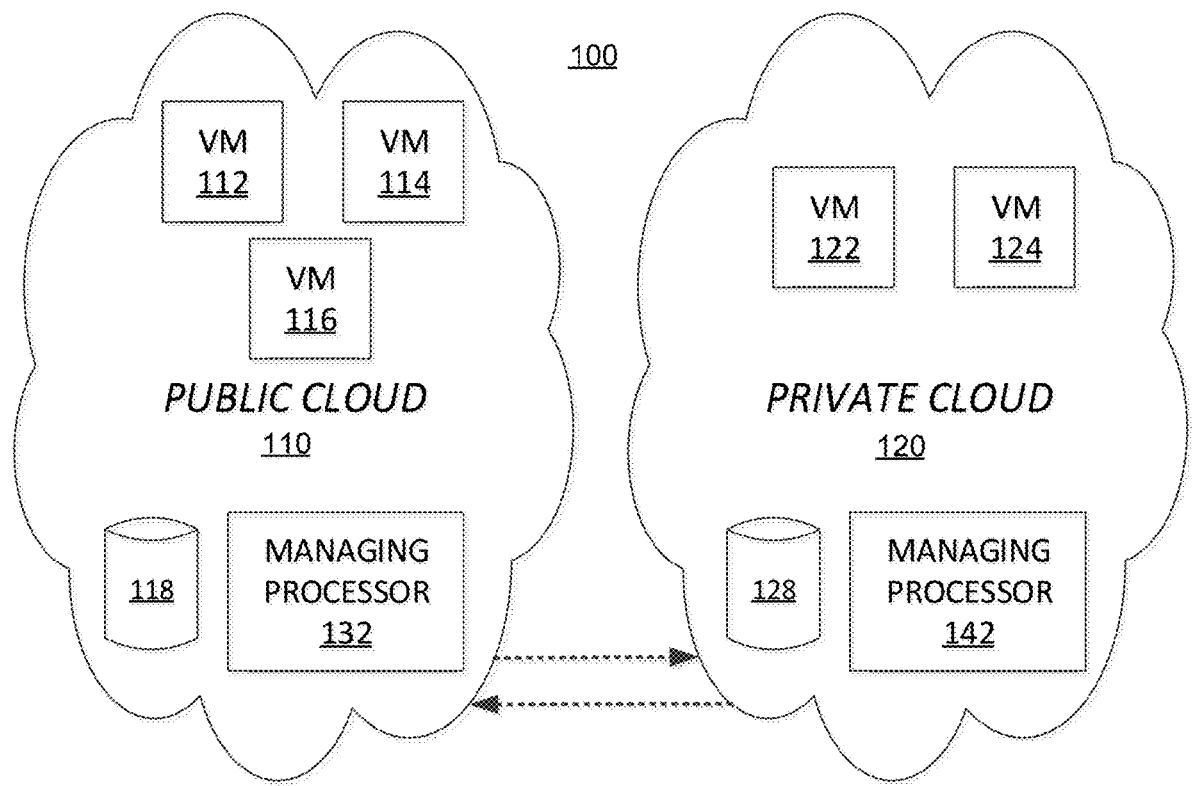
FIG. 1 is a block diagram of a hybrid cloud computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a virtual computing system having a plurality of clusters, with each cluster having a plurality of nodes. Each of the plurality of nodes includes one or more virtual machines managed by an instance of a hypervisor. A variety of management and non-management related operations may be performed on the virtual machine.

In a hybrid cloud, computing assets are allocated in both one or more private clouds and one or more public clouds. Hybrid clouds present a number of technical challenges. For example, keeping track of the history of computing entities, such as virtual machines (VMs) and virtual disks (vDisks), in a hybrid cloud is challenging. Such computing entities may be referred to as configuration items. It can be important when attempting to resolve an issue raised in such a virtual environment to take a holistic view of the computing environment at the time the issue happened because the systems are logically separate and the computing environment may have already changed by the time the issue is investigated.

In the context of private clouds, information technology (IT) administrators can use stand-alone Configuration Management Database (CMDB) systems to "look back in time" to identify the status and configuration of the system at the time. However, existing CMDB systems require different software and interfaces for displaying system history. Also, existing CMDB systems are unable to combine historical views from a public cloud with historical views from on-premises systems. There is a need for a hybrid cloud system that provides historical views of virtual computing systems using a mix of on-premises, private cloud with third party, public cloud services.

Exemplary embodiments described herein provide a unified entity trail database that allows users to navigate through both on-premises and off-premises CMDB data using a common management software.

According to an exemplary embodiment, the system uses a proxy object at an on-premises system representing a time at which an object exited the on-premises system. Such an object can be used when an on-premises entity like a virtual machine (VM) is moved to a public cloud. The proxy object can include information about the destination system and identifiers. Another proxy object is provided on the public cloud side that includes information about the source location and identifiers.

During management software queries on the public cloud, if the time queried is before the entity started as an object on the public cloud, the system invokes an on-premises management software application program interface (API) to obtain the history of the entity. Similarly, during management software queries on the private, on-premises cloud, if the time queried is after the entity has moved to the public cloud, the system invokes a public cloud management software API to obtain the history of that entity. The described embodiments enable a management software program to provide a history of entities in the system. As such, one management software program can "replay" history of entities in the system regardless of whether the entities are on the public cloud or the private cloud and regardless of whether the entities have moved.

FIG. 1 illustrates a virtual system 100 having a public cloud system 110 with virtual machine (VM) entities such as VM 112, VM 114, and VM 116 and a database 118. The virtual system 100 also includes a private cloud system 120 with virtual machine (VM) entities such as VM 122 and VM 124 and a database 128. Public cloud system 110 and private cloud system 120 may include additional entities including virtual disks. Database 118 and database 128 can be configuration management databases that store configuration information for entities hosted on the respective cloud systems.

According to an illustrative embodiment, when VM 122 moves from private cloud system 120 to public cloud system 110, a managing processor 142 adds a proxy object to database 128 indicating moment of VM 122 exiting private cloud system 120. The proxy object can include information about the destination cloud system (public cloud system 110) and a timestamp indicating the time of the move. Similarly, on the side of the public cloud system 110, when VM 112 moves from public cloud system 110 to private cloud system 120, a managing processor 132 adds a proxy object to database 118 indicating movement of VM 112 exiting public cloud system 110. The proxy object can include information about the destination cloud (private cloud system 120) and a timestamp indicating the time of the move.

The virtual machines in virtual system 100 may be supported by one or more nodes that include file storage devices. The nodes may be a hardware device such as but is not limited to a server. For example, one or more of the nodes may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other examples, one or more of the nodes may be another type of device that is suitable for use as a node within the system 100.

According to an exemplary embodiment, each of VM 112, VM 114, and VM 116 of the public cloud system 110 and VM 122 and VM 124 of the private cloud system 120 is a software-based implementation of a computing machine and emulate functionalities of a physical computer. Specifically, hardware resources such as but not limited to, processing units, memory units, storage, etc., of the underlying computers (e.g., the nodes) are virtualized or transformed by a hypervisor into the underlying support for each of the VMs that may run its own operating system (OS) and applications on the underlying physical resources in a manner similar to an actual computer. By encapsulating an entire machine, including CPU, memory, operating system, storage devices, and network devices, the VMs can be configured to be compatible with standard OSs (e.g. Windows, Linux, etc.), applications, and device drivers.

The virtual system 100, which is the combination of the public cloud system 110 and the private cloud system 120 is a hybrid cloud. Database 118 in the public cloud system 110 and database 128 in the private cloud system 120 can include configuration management information about entity configurations in the system. Proxy objects are stored in the databases with information regarding a time at which an entity exists the system. For example, if VM 112 leaves the public cloud system 110 to go to the private cloud system 120, then database 118 receives a proxy object including information about the destination system (private cloud system 120) and identifiers. Database 128 in the private cloud system 120 also receives a proxy object including information about the source system (public cloud system 110) and identifiers.

When a management software queries the public cloud system 110, time stamps in the proxy objects stored in database 118 are compared with the time queried. If the time queried is before the entity (e.g., VM 112) started as an object on the public cloud, the system invokes an on-premises management software application program interface (API) to obtain the history of the entity. Similarly, during management software queries on the private, on-premises cloud, if the time queried is after the entity has moved to the public cloud, the system invokes a public cloud management software API to obtain the history of that entity.

Figure 2:
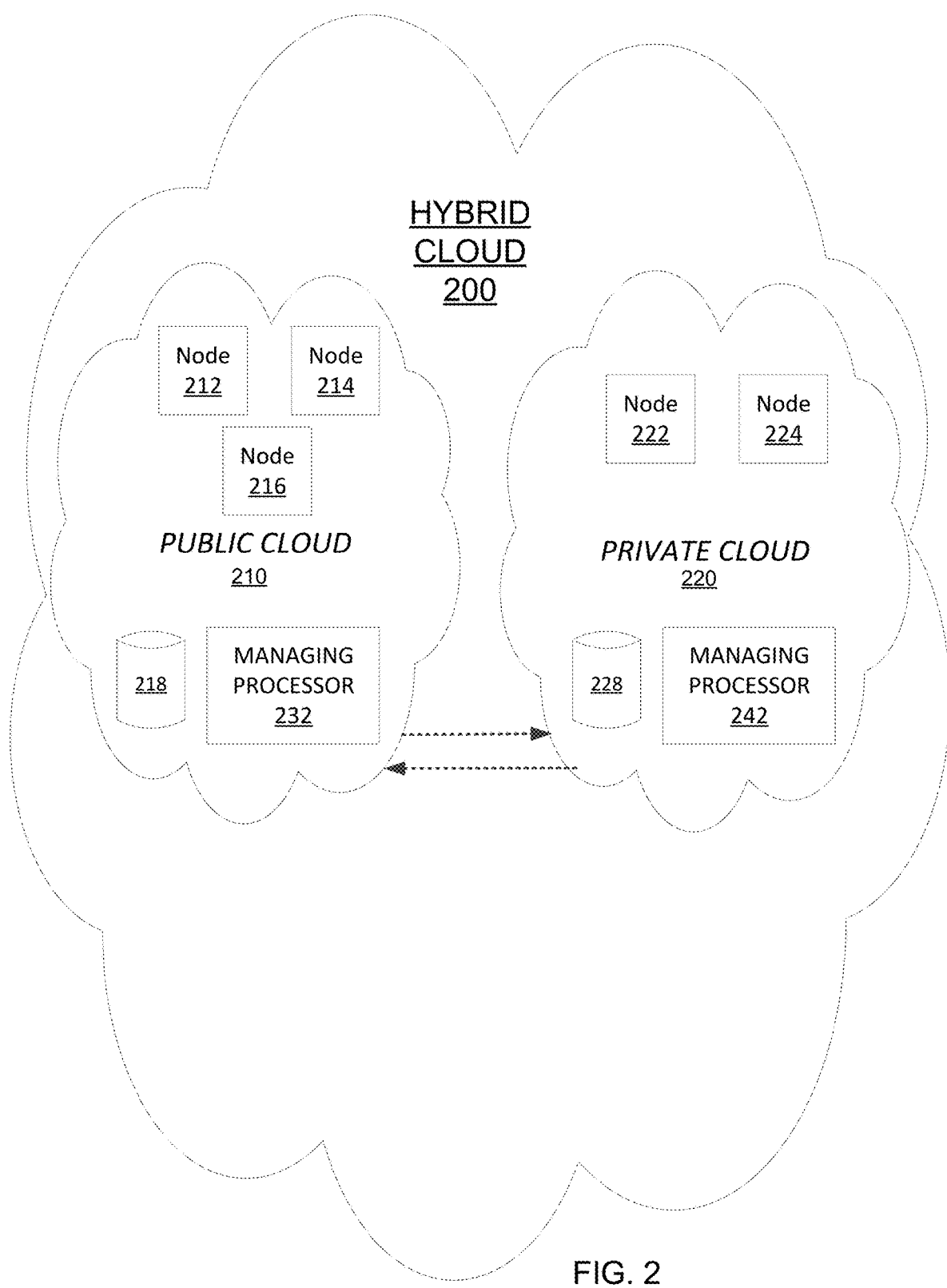
FIG. 2 is another block diagram of a hybrid cloud computing system, in accordance with some embodiments of the present disclosure.

FIG. 2 illustrates a hybrid system 200 having a public cloud sub-system 210 with nodes such as nodes 212, 214, and 216 and a database 218. The hybrid system 200 also includes a private cloud sub-system 220 with nodes 222 and 224 and a database 228. Public cloud sub-system 210 and private cloud sub-system 220 may include additional or fewer nodes. The nodes can include compute only (CO) nodes that support compute resources and no file storage resources. The nodes can also include hyper converged (HC) nodes that support compute resources and file storage resources. The nodes can include virtual machines (VM) and virtual disks (vdisks). Database 218 and database 228 can be configuration management databases that store configuration information for entities hosted on the respective cloud systems.

Similar to system 100 described with reference to FIG. 1, hybrid cloud 200 provides for movement of entities from the public cloud sub-system 210 to the private cloud sub-system 220 and vice versa. For example, a virtual machine (VM) hosted by node 212 can move from private cloud sub-system 220 to public cloud sub-system 210. When such an entity move is made, a managing processor 242 adds a proxy object to database 228 indicating moment of the VM exiting private cloud sub-system 220. The proxy object can include information about the destination cloud system (public cloud sub-system 210) and a timestamp indicating the time of the move. Similarly, on the side of the public cloud sub-system 210, when the VM from node 212 moves from public cloud sub-system 210 to private cloud sub-system 220, a managing processor 232 adds a proxy object to database 218 indicating movement of the VM exiting public cloud sub-system 210. The proxy object can include information about the destination cloud (private cloud sub-system 220) and a timestamp indicating the time of the move.

Figure 3:
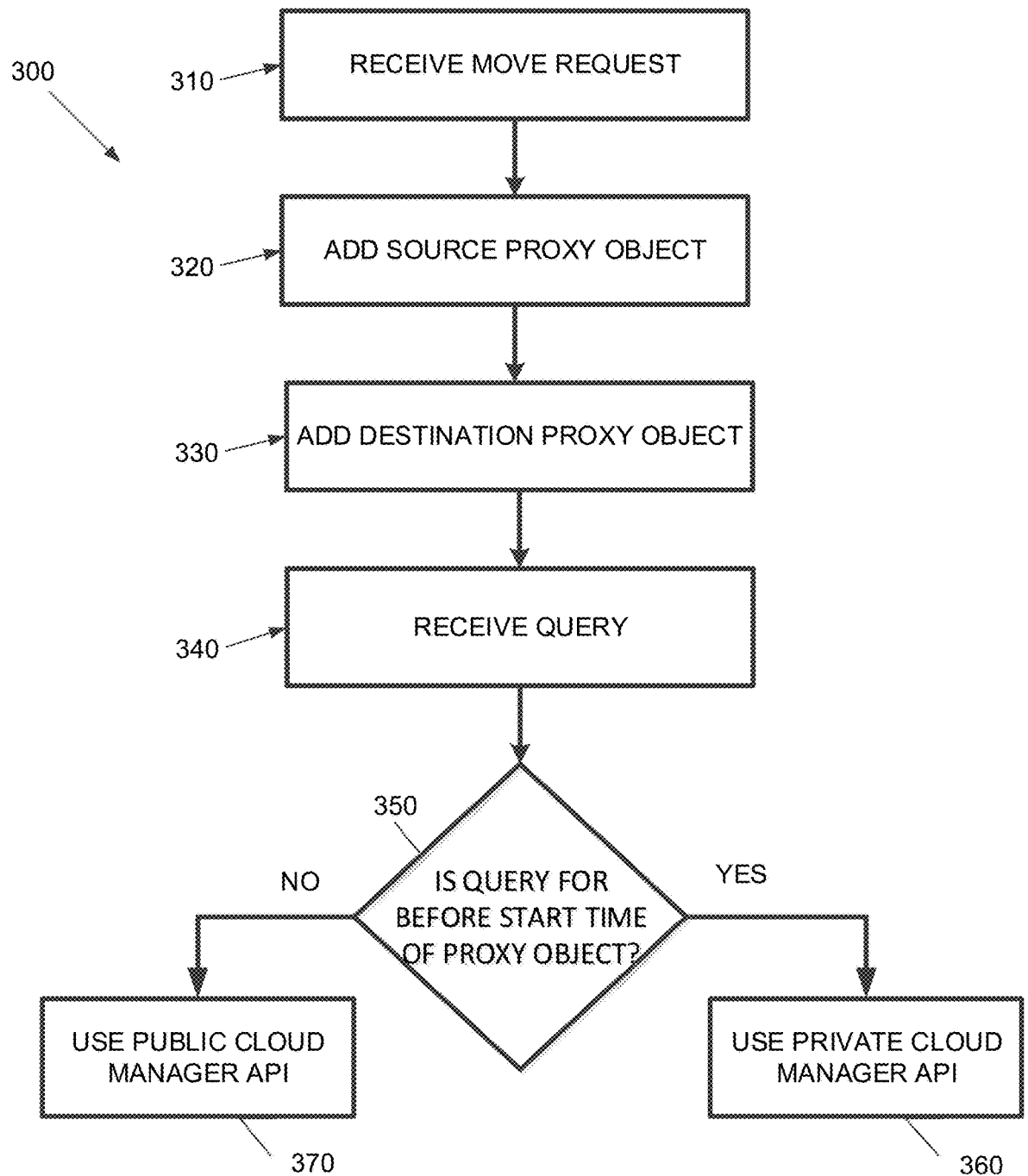
FIG. 3 is an example flowchart outlining operations providing a history of computing entities in a virtual hybrid cloud system, in accordance with some embodiments of the present disclosure.

FIG. 3 is a flowchart outlining operations for a method for providing a history of computing entities in a virtual hybrid cloud system in accordance with some implementations of the present disclosure. Additional, fewer, or different operations may be performed in the method depending on the implementation and arrangement. Very briefly, a method 300 includes a private cloud system receiving a move request to move an entity to a public cloud system (310). The private cloud system adds a source proxy object to a database including a destination identifier and an exit time (320). The public cloud system adds a destination proxy object to a database including a source identifier and an arrival time (330). The method further includes the private cloud system receiving a query from a software management program (340) and the private cloud system determining if the query relates to a time before the start time of a proxy object (i.e., when an entity exited the private cloud system and moved to a public cloud system) (350). If the query relates to a time before the entity moved, a private cloud manager API is used to provide the entity information requested (360). If the query relates to a time after the entity moved, a public cloud manager API is used to provide the entity information requested (370). A similar method is used for moving an entity from a public cloud system to a private cloud system and for a query to a public cloud system regarding entities in that system that may have moved to a private cloud system.

At 310, a private cloud system receives a move request to move an entity to a public cloud system. The move request may be for a virtual machine (VM) to logically move from the private cloud to the public cloud. The reverse may also apply in that the public cloud system can receive a move request to move an entity from it to the private cloud system.

At 320, the managing processor of the private cloud system adds a source proxy object to a database in the private cloud system. The source proxy includes a destination identifier and an exit time. The destination identifier references the public cloud system that is the destination for the entity that is moving. The exit time is a time when the entity leaves the private cloud system and can be used as a reference for queries made later.

At 330, a managing processor for the public cloud system adds a destination proxy object to a database in the public cloud system. The destination proxy includes a source identifier and an arrival time. The source identifier references the private cloud system that is the source for the entity that is moving. The arrival time is a time when the entity arrives at the private cloud system and can be used as a reference for queries made later. The entities in a virtual system generally are not physically moved, rather their logical associations are changed. Such changes occur very quickly and, as such, the exit time at the private cloud system and the arrival time at the public cloud system are likely to be the same or substantially the same.

At 340, the hybrid cloud system including both the public cloud system and the private cloud system receives a query from a management software program regarding an entity. The query includes an identifier for the entity and a time of query. The time of query can be a present time or a past time. The entity can be a virtual machine, a virtual disk, or any other entity in the cloud system. In at least one embodiment, the query is transmitted as a broadcast request to a plurality of systems. In at least one embodiment, the query includes a time range, such as a first time and a second time, instead of one time of query.

At 350, the cloud system determines if the received query requests information on an entity at a time before the start time of the proxy object. The start time of the proxy object is when the entity exited the cloud system. Thus, if the requested time in the query is before the start time of the proxy object, then the entity was present in the cloud system at the time requested and a configuration database for the cloud system can provide entity configuration information via a cloud manager application program interface (API). At 360, the cloud manager API provides information responsive to the query at the requested time.

Advantageously, method 300 enables a common management software program to display live states and configurations in a history view for the hybrid cloud system. That is, one program can provide information about the state and configuration for virtual entities, such as VMs and vDisks, regardless of whether the entity is in a private cloud or a public cloud. One software program is enabled by the described method and system to "replay" the history of one or more virtual entity. The history can include details on when and where a virtual entity moved during a certain time period. Prior systems required different management software programs to obtain such information. Tracking a particular VM is not necessarily available in a history replay output by the management software; however, using the described embodiments, an IT administrator is able to determine the history of the particular VM even when it moves across cloud systems. The embodiments described with reference to the figures here enable both current and historical views from an entire hybrid system including entities that move across cloud systems.

If the requested time in the query is after the start time of the proxy object, then the entity had exited the cloud system at the time requested and a configuration database for the new host cloud system can provide entity configuration information via a cloud manager application program interface (API). At 370, the cloud manager API of the new cloud system provides information responsive to the query at the requested time.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, at a processor, a migration request to move a virtual entity from a first cloud computing system to a second cloud computing system;
   receiving, at the processor, a management query requesting status of the virtual entity, wherein the management query includes a query time corresponding to a time for which status of the virtual entity is requested;
   determining, at the processor, whether the query time is before an exit time of the virtual entity from the first cloud computing system to the second cloud computing system; and
   invoking, from the processor, a software application program interface (API) for the first cloud computing system when the query time is before the exit time.

2. The method of claim 1, further comprising adding, by the processor, a destination proxy object representing the virtual entity joining the second cloud computing system to a second database, wherein the destination proxy object includes a source identifier and an arrival time.

3. The method of claim 1, wherein the first cloud computing system includes a private cloud computing system and the second cloud computing system includes a public cloud computing system.

4. The method of claim 1, further comprising invoking, from the processor, a second management software API for the second cloud computing system when the query time is after the exit time.

5. The method of claim 4, wherein invoking the second management software API for the second cloud computing system includes obtaining virtual entity information and information on the second cloud computing system.

6. The method of claim 1, further comprising executing, by the processor, a logical migration of the virtual entity from the first cloud computing system to the second cloud computing system.

7. The method of claim 1, further comprising adding to a first database, by the processor, a source proxy object representing the virtual entity exiting the first cloud computing system, wherein the source proxy object includes a destination identifier and an exit time.

8. The method of claim 7, wherein the first database is a configuration management database.

9. The method of claim 1, wherein the query time is a time range.

10. The method of claim 1, wherein invoking the software API for the first cloud computing system includes obtaining virtual entity information and information on the first cloud computing system.

11. A migration server comprising:
    a processing unit having a processor and a memory, wherein the processing unit includes programmed instructions that when executed cause the processing unit to:
      receive a migration request to migrate a virtual entity from a first cloud computing system to a second cloud computing system;
      receive a management query requesting status of the virtual entity, wherein the management query includes a query time corresponding to a time for which status of the virtual entity is requested;
      assess whether the query time is before an exit time of the virtual entity from the first cloud computing system to the second cloud computing system; and
      obtain virtual entity information using a software application program interface (API) for the first cloud computing system when the query time is before the exit time.

12. The migration server of claim 11, wherein the programmed instructions when executed further cause the processing unit to add a destination proxy object representing the virtual entity joining the second cloud computing system to a second database, wherein the destination proxy object includes a source identifier and an arrival time.

13. The migration server of claim 11, wherein the first cloud sub-system includes a private cloud computing system and the second cloud computing system includes a public cloud computing system.

14. The migration server of claim 11, wherein the processing unit is further configured to obtain virtual entity information using a second software API for the second cloud computing system when the query time is after the exit time.

15. The migration server of claim 11, wherein the processing unit receives a broadcast message with a time range for the query time.

16. The migration server of claim 11, wherein the programmed instructions when executed further cause the processing unit to perform a logical migration of the virtual entity from the first cloud computing system to the second cloud computing system.

17. A non-transitory computer readable media with computer-executable instructions embodied thereon that, when executed by a processor of an entity management system of a virtual computing system, cause the entity management system to perform a process comprising:
    receiving a migration request to move a virtual entity from a first cloud computing system to a second cloud computing system;
    receiving a management query requesting status of the virtual entity, wherein the management query includes a query time corresponding to a time for which status of the virtual entity is requested;

determining whether the query time is before an exit time of the virtual entity from the first cloud computing system to the second cloud computing system; and invoking a software application program interface (API) for the first cloud computing system when the query time is before the exit time.

18. The non-transitory computer readable media of claim 17, further comprising adding a destination proxy object representing the virtual entity joining the second cloud computing system to a second database, wherein the destination proxy object includes a source identifier and an arrival time.

19. The non-transitory computer readable media of claim 17, wherein invoking the software API for the first cloud computing system includes obtaining virtual entity information and information on the first cloud computing system.

20. The non-transitory computer readable media of claim 17, wherein receiving the management query including the query time includes receiving a broadcast message including a time period.

21. The non-transitory computer readable media of claim 17, further comprising adding a source proxy object representing the virtual entity exiting the first cloud sub-system to a first database, wherein the source proxy object includes a destination identifier and the exit time.

22. The migration server of claim 11, wherein the programmed instructions when executed further cause the processing unit to create a source proxy object in a first database, wherein the source proxy object represents the virtual entity leaving the first cloud sub-system to a first database, wherein the source proxy object includes the exit time.

* * * * *